May 20, 1930.  W. L. BURNS  1,758,928
BOTTLE CARRIER
Filed Jan. 30, 1929   3 Sheets-Sheet 3
FIG_5_
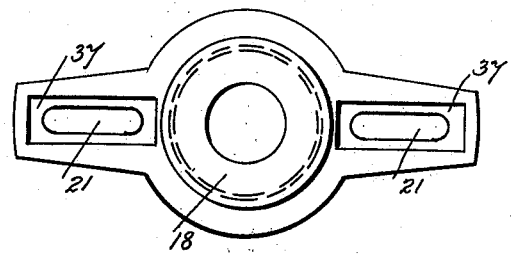
FIG_6_
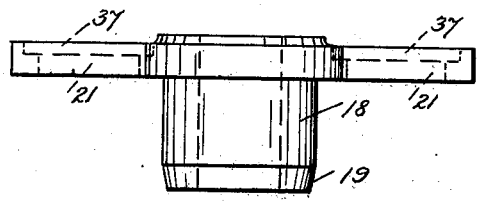
FIG_7_
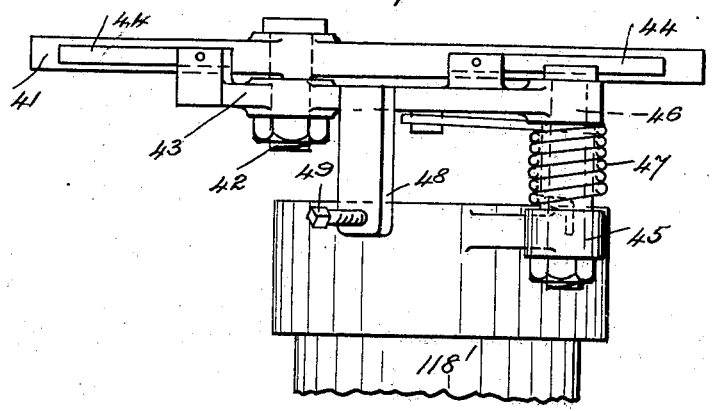
Inventor,
William L. Burns
by Herbert W. T. Jenner
Attorney Patented May 20, 1930

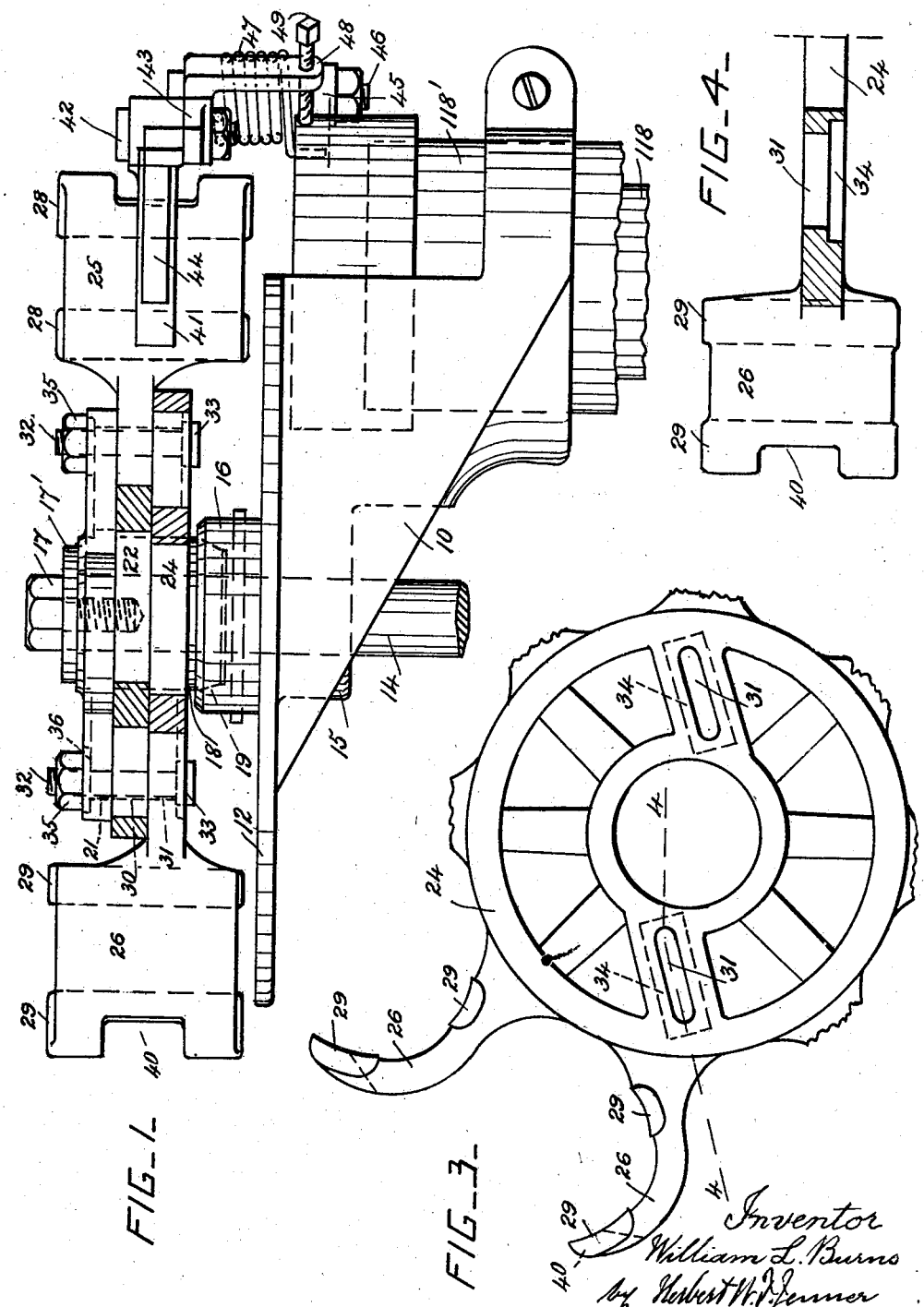

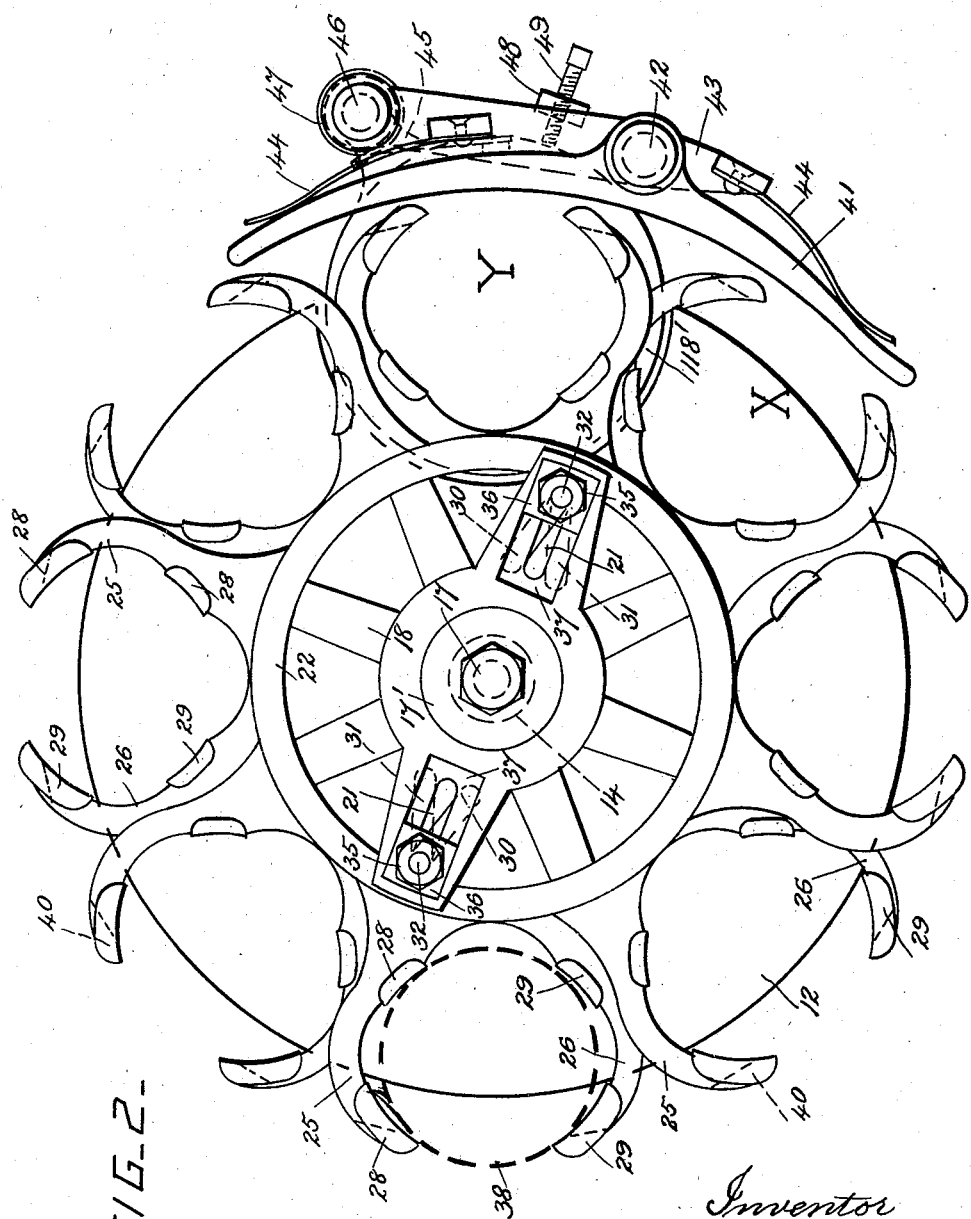

1,758,928

UNITED STATES PATENT OFFICE

WILLIAM L. BURNS, OF BALTIMORE, MARYLAND, ASSIGNOR TO BURNS BOTTLING MACHINE WORKS, INC., OF BALTIMORE, MARYLAND

BOTTLE CARRIER

Application filed January 30, 1929. Serial No. 336,223.

This invention relates to bottle carriers used in connection with bottling machines such as shown in the patent to Frederick W. Letsch, No. 1,227,807, dated May 29, 1917, but which may be used in connection with other bottling machines of approved construction. In such machines the bottles are placed in a turret having a carrier which is rotated step by step so that the bottles are placed one after another under the operating head of the machine. According to the present invention the turret is provided with an adjustable carrier for moving the bottles circumferentially, and has also means for clamping the bottles in the carrier at certain positions under the operating head of the bottling machine. The carrier and clamping device are constructed as hereinafter fully described and claimed. The carrier can be adjusted so that it will take in all necessary sizes of bottles and hold them at a uniform distance apart, and the clamping devices are arranged to clamp the bottles securely in the carrier when they are centered suitably with respect to the operating head of the machine.

Prior to this invention carrier rings for bottles have been provided with spring gates, and have been mounted in a grooved head block formed of a plurality of sections, and the carrier rings have been adjusted by toothed wheels, and have been provided with clamping devices formed separately from their adjusting devices. An important advantage is obtained by the present invention by making the driving hub on which the carrier rings are mounted of a single piece of metal, without any circumferential groove, and in dispensing with the toothed adjusting wheels, and also in effecting the adjustment of the carrier rings or members by means of the same devices which are provided for subsequently clamping them together and to the driving hub. The construction of the bottle carrier is in this manner greatly simplified, it is less expensive to manufacture, and is less liable to get out of order.

In the drawings, Fig. 1 is a side view showing parts of a turret provided with a bottle carrier and clamp according to this invention. Fig. 2 is a plan view of the bottle carrier and clamp shown in Fig. 1. Fig. 3 is a plan view of portions of one of the carrier members. Fig. 4 is a cross-section, taken on the line 4—4 in Fig. 3. Fig. 5 is a plan view of the driving hub. Fig. 6 is a side view of the same. Fig. 7 is a rear view of the clamping device shown in Figs. 1 and 2.

The bottling machine is provided with a turret for holding the bottles which has a supporting bracket 10 provided with a flat plate or table 12 at its top upon which the bottles rest.

This bracket is secured to the casing 118' of the plunger 118 in the machine shown in the patent to Letsch above referred to, but it may be secured and supported in any other approved way. A vertical driving shaft 14 is journaled in a bearing 15 on the bracket, and it is rotated step by step by any approved driving mechanism, which is not shown. This shaft has a friction clutch member 16 secured to its upper part, and a central driving hub 18 is provided and mounted on the shaft, and has a friction clutch member 19 at its lower part which engages with the clutch member 16. A screw 17 is screwed into the shaft, and is provided with a washer 17' which holds the friction clutch members in driving engagement, and permits the position of the carrier to be adjusted circumferentially on the shaft. Any other approved means may however be provided for holding the driving hub on the driving shaft. The driving hub is provided with arms having radial slots 21.

Two carrier members 22 and 24 are provided, and are pivoted on the hub 18 below the arms. These carrier members are arranged one above the other, and are formed right and left. The upper carrier member 22 has curved jaws 25 projecting from it, and the lower carrier member 24 has similar jaws 26 but curved in the reverse direction to the jaws 25, so that the jaws 25 and 26 form pairs of jaws adapted to engage with bottles. The jaws 25 have inner and outer carrier bars 28 having suitably curved faces, and these carrier bars project vertically. The jaws 26 have similar carrier bars 29 which are arranged opposite the bars 28. The bars are proportioned so that their tops and bottoms are all in the same planes.

The jaws may be provided with other approved means for engaging the bottles, but the bars as shown are preferred, as each pair of jaws can then engage with a bottle at four points.

The bars are also adapted for any sized bottle used in connection with bottling machines.

The carrier member 22 is provided with slots 30, and the carrier member 24 is provided with slots 31. These slots are similar to the slots 21 of the driving hub, but are inclined to the slots 21, which are radial. The slots 30 are inclined in the reverse direction to the slots 31, as shown in Fig. 2. Clamping bolts 32 are arranged in the slots, and the heads 33 of these bolts are let into recesses 34 in the lower carrier member so that the bolts will not rotate. The bolts have nuts 35 at their upper parts, and washers 36 which are let into recesses 37 in the arms of the driving hub.

The bottles, as indicated by the dotted circle 38 in Fig. 2, are placed in the pairs of jaws. When smaller bottles are used the carrier members are unclamped, and the clamping bolts are slid inwardly in the slots. The carrier members are moved pivotally in opposite directions by the bolts so that the jaws are reduced sufficiently to adapt them to the smaller sized bottles. The bottles of the same size are not all of exactly the same diameter, nor are they all perfectly cylindrical, and the jaws are set so that they will admit all the bottles without gripping any one of them tightly. The bottles are held at uniform distances apart, irrespective of their size, and at a uniform distance from the axis of the driving shaft, and they can be placed in and removed from the carrier with ease and facility, which is necessary so that the bottling machine can be used to advantage.

When the clamping nuts are tightened they raise the carrier members a little so that they may be rotated freely by the driving hub to place the bottles one by one under the operating head of the bottling machine.

The clamping bolts are preferably arranged so that the bolts are slid inwardly for the smaller bottles as the smaller bottles do not require the carrier members to be so tightly clamped as when used for the larger bottles. The jaws and bars of the carrier members are preferably provided with circumferential slots 40 so as to clear a clamping bar 41 when the carrier is used for bottles of small size.

The clamping bar 41 is preferably made of a length to overlap two pairs of jaws, and is suitably curved so as to engage with the bottles when they arrive at the positions marked X and Y in Fig. 2. The clamping bar is pivoted between its ends by a pin 42 to an arm 43, and its end portions are pressed towards the bottles by two flat springs 44 which are secured to the arm 43. The arm 43 is pivoted at one end to a lug or bracket 45 on the plunger casing or other suitable support by a pin 46. The lug is preferably formed on the cap of the casing, but may be secured to it in any other approved way. The arm 43 is pressed pivotally towards the bottles by a helical spring 47 which encircles the hub of the arm and the pivot pin 46 and has its ends connected with the support and the arm. A stop lug 48 projects downwardly from the arm 43 and is provided with an adjustable stop screw 49 which bears on the cap of the plunger casing, and limits the movement of the clamping bar and the arm so that they cannot strike the bottle carrier.

When the bottles are moved by the bottle carrier into engagement with the clamping bar the springs cause the clamping bar to press the bottles against the inner carrier bars of the jaws, so that the bottles are positioned accurately under the operating head of the machine, and are clamped and held upright and steady during the bottling operations.

The clamping bar 41 is pivoted between its ends so that the bottle at position Y is held securely centered under the bottling head by one end portion of the bar 41, which is pressed inwardly by the outward pressure of the bottle at the position X against the other end portion of the bar 41. Each bottle, after passing from the position Y, is relieved of pressure when the next bottle comes opposite the pivot of the bar 41. This arrangement permits the bottle carrier to be rotated with economy of power. The bottles are easily placed in position in and removed from the jaws as it is not necessary for them to be gripped in the jaws except when centered under the bottling head.

What I claim is:

1. In a bottle carrier, a rotary driving hub provided with radial slots, a pair of adjustable carrier members pivoted on the hub and provided with jaws for engaging the bottles, each carrier member having slots arranged at an angle to the slots in the hub, and the slots of one carrier member being inclined in the reverse direction to the slots in the other, and clamping bolts engaging with the slots in the hub and in the carrier members and slidable radially of the hub to adjust the size of the said jaws.

2. A bottle carrier as set forth in claim 1, the slots of the hub being formed in arms arranged at its upper part and projecting over the carrier members so that they are drawn upwardly against the arms when the bolts are tightened.

3. A bottle carrier, comprising a rotary driving device, a pair of adjustable carrier members pivoted concentric with the driving device and provided with jaws for engaging with bottles, and a combined adjusting and clamping device for constraining the carrier members to move pivotally in opposite directions to adapt their jaws to bottles of different size and for clamping them to the driving device.

4. The combination, with a support, and a rotary bottle carrier journaled therein and provided with pairs of jaws; of an arm pivoted to the support and arranged to one side of the bottle carrier, a spring pressing the arm towards the carrier, and a clamping bar pivoted to the said arm and operating to clamp the bottles in the jaws as the carrier is rotated.

5. A combination of parts as set forth in claim 4, the said clamping bar being pivoted between its ends to the said arm, and provided with spring arranged between the said arm and the end portions of the clamping bar.

6. A combination of parts as set forth in claim 4, the said spring being a helical spring encircling the pivot which connects the arm to the said support.

7. A combination of parts as set forth in claim 4, the said arm being provided with a projecting stop which engages with the said support and prevents the clamping bar from striking the carrier.

8. A combination of parts as set forth in claim 4, the said bottle carrier being provided with circumferential slots in the peripheral portions of its jaws, and said slots being arranged opposite the said clamping bar to permit it to engage with bottles of small size in the jaws.

9. The combination, with a rotary bottle carrier provided with pairs of jaws, of a supporting member provided with a pivot and arranged to one side of the bottle carrier, means for pressing the said supporting member towards the bottle carrier, a bottle clamping bar pivoted between its ends on the said pivot, and springs arranged between the supporting member and each end portion of the clamping bar.

10. A combination of parts as set forth in claim 9, the said clamping bar being of a length sufficient to engage with the bottles in two adjacent pairs of jaws of the bottle carrier.

11. In a bottle carrier, a rotary driving hub provided with a radial slot, a pair of adjustable carrier members provided with jaws and pivoted on the hub, each carrier member having a slot arranged at an angle to the slot in the hub, and the slot in one carrier member being inclined in the reverse direction to the slot in the other, and a bolt engaging with the slots and operating to adjust the size of the said jaws when slid radially of the hub.

12. A bottle carrier as set forth in claim 11, the jaws of the said carrier members being provided with integrally formed inner and outer carrier bars for engaging the bottles, said bars being arranged vertically and projecting from the faces of the jaws.

13. In a bottle carrier, a vertical driving shaft having a clutch at its upper part, a hub mounted loosely on the shaft above the clutch member and also provided with a clutch member, bottle carrier members mounted on the hub, a washer bearing on the top of the hub, and a fastening device at the top of the shaft operating to press the washer against the hub so as to hold the clutch members in driving engagement when the position of the hub with the carrier members has been adjusted circumferentially on the shaft.

14. In a bottle carrier, a rotary driving hub provided with an arm having a radial slot and a radial recess in its upper side, a pair of adjustable carrier members pivoted on the hub and provided with jaws, each carrier member having a slot arranged at an angle to the slot in the said arm, the slot in one carrier member being inclined in the reverse direction to the slot in the other carrier member, and the lower carrier member having a recess in its lower side, guide washers slidable in the recess of the said arm and lower carrier member, and a combined adjusting and clamping bolt engaging with the said washers and slots and slidable radially of the hub.

15. A bottle carrier as set forth in claim 14, the inclined slots of the carrier members being arranged so that the clamping bolt is at their outer ends when the jaws are adjusted for large bottles, and being slidable inwardly to adjust the jaws for small bottles.

In testimony whereof I affix my signature.

WILLIAM L. BURNS.